United States Patent [19]

Garavuso

[11] 4,418,905
[45] Dec. 6, 1983

[54] SHEET FEEDING APPARATUS

[75] Inventor: Gerald M. Garavuso, Macedon, N.Y.

[73] Assignee: Xerox Corporation, Stamford, Conn.

[21] Appl. No.: 317,219

[22] Filed: Nov. 2, 1981

[51] Int. Cl.³ .............................................. B65H 3/14
[52] U.S. Cl. ...................................... 271/98; 271/99; 271/105
[58] Field of Search ...................... 271/97, 98, 99, 105

[56] References Cited

U.S. PATENT DOCUMENTS

| 1,804,476 | 5/1931 | Novick | 271/98 X |
| 2,402,442 | 6/1946 | Perry | 271/26 |
| 2,594,373 | 4/1952 | Watson | 271/26 |
| 3,079,149 | 2/1963 | Childs | 271/27 |
| 3,294,396 | 12/1966 | Staines | 271/26 |
| 3,424,453 | 1/1969 | Halbert | 271/35 |
| 3,980,293 | 9/1976 | Shelmire | 271/93 |
| 4,275,877 | 6/1981 | Silverberg | 271/98 X |

FOREIGN PATENT DOCUMENTS 1095853 12/1960 Fed. Rep. of Germany ...... 271/105
184884 9/1963 Sweden .............................. 271/98

Primary Examiner—Richard A. Suhacher

[57] ABSTRACT

Apparatus for feeding sheets from a stack of sheets on sheet stack supporting tray which includes means to feed a sheet from and an air injection means disposed adjacent the front of the tray to inject air between the sheet to be separated and the remainder of the stack, the air injection means injecting a planar stream of air which has portions at its ends which converge toward the center of the planar air stream thereby providing both convergence in the planar air stream and expansion in a direction perpendicular to that of the air stream resulting in improved sheet separation. In a preferred embodiment the air injection means includes an array of nozzles, the end nozzles of which are inclined toward the center of the air stream so that the air will converge over the center of the sheet stacking tray. The array of nozzles is directed at an angle down to a stack of sheets in a sheet stacking tray which has a bottom sheet feeder associated with it.

20 Claims, 17 Drawing Figures

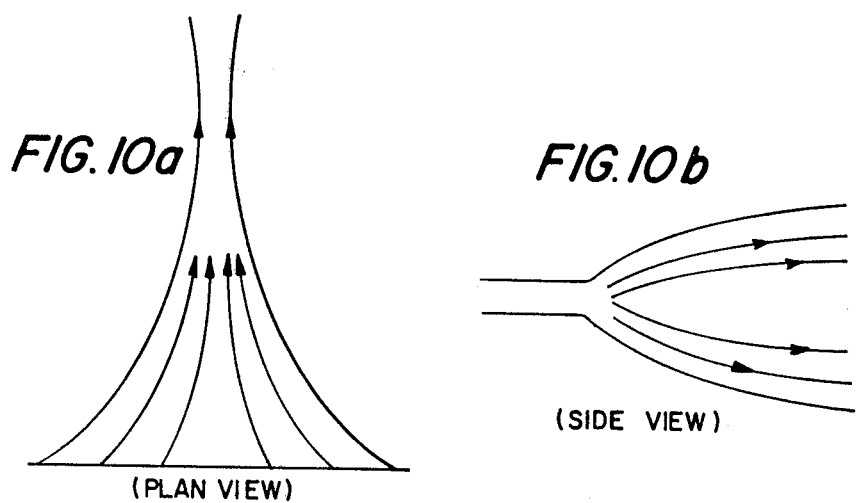
FIG. 10a (PLAN VIEW)
FIG. 10b (SIDE VIEW)
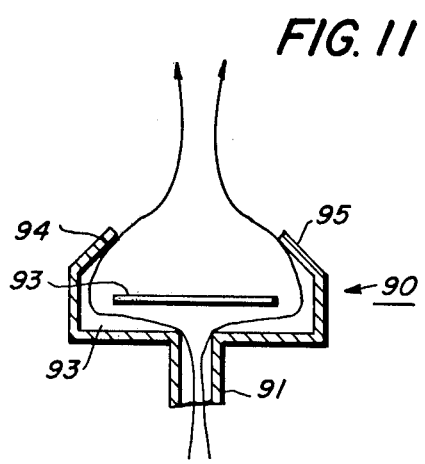
FIG. 11

SHEET FEEDING APPARATUS

REFERENCE TO RELATED APPLICATIONS

Reference is hereby made to copending application Ser. No. 317,212, entitled BOTTOM SHEET FEEDING APPARATUS in the name of John M. Browne filed concurrently herewith and to Ser. No. 317,211, entitled SHEET FEEDING APPARATUS in the name of John M. Browne also filed concurrently herewith both commonly assigned to the Assignee of the present application.

BACKGROUND OF THE INVENTION

The present invention relates to sheet feeding apparatus and in particular to sheet separating and feeding apparatus. A specific embodiment is directed to an air injection means for use with a bottom vacuum corrugating feeding apparatus.

With the advent of high speed xerographic copy reproduction machines wherein copies can be produced at a rate in excess of three thousand copies per hour, the need for a document handler to feed documents to the copy platen of the machine in a rapid, dependable manner was recognized to enable full utilization of the reproduction machine's potential copy output. A number of document handlers are currently available to fill that need. These document handlers must operate flawlessly to virtually eliminate the risk of damaging the originals and generate minimum machine shutdowns due to uncorrectable misfeeds or document multifeeds. It is in the initial separation of the individual documents from the document stack where the greatest number of problems occur.

Since the documents must be handled gently but positively to assure separation without damage through a number of cycles, a number of separators have been suggested such as friction rolls or belts used for fairly positive document feeding in conjunction with a retard belt, pad, or roll to prevent multifeeds. Vacuum separators such as sniffer tubes, rocker type vacuum rolls, or vacuum feed belts have also been utilized.

While the friction roll-retard systems are very positive, the action of the retard member, if it acts upon the printed face can cause smearing or partial erasure of the printed material on the document. With single sided documents, this does not present a problem as the separator can be designed so that the retard mechanism acts upon the underside of the document. However, with documents printed on both sides, there is no way to avoid the problem. Additionally, the reliable operation of friction retard feeders is highly dependent on the relative frictional properties of the paper being handled. This cannot be controlled in a document feeder.

In addition, a typical vacuum separating and feeding system is that described in U.S. Ser. No. 81,594 entitled "Sheet Separator" to Hamlin, wherein a plurality of friction belts is arranged to run over a vacuum plenum placed at the bottom of a sheet supply tray which has a "U" shaped pocket formed in it. The pocket serves to provide space for the bottom sheet to be captured by the vacuum feed belt assembly, to provide an air seal between the bottom document and the edges of the pocket and to provide a high pressure seal between the bottom sheet and the remainder of the stack. This high pressure seal is achieved by supporting a major portion of the stack weight on the edge regions of the pocket. This seal serves to convert the velocity energy of the air knife flow into a lifting pressure over the pocket area to levitate the remainder of the stack of sheets. This configuration has been used on a commercial scale in the Xerox 5600 machine and while it has been highly successful in operation, certain aspects can be improved. In particular the operating window for air knife pressure and stack weight is relatively low which when exceeded causes an unstable pocket to exist. This is manifested by the second sheet vibrating independent of the rest of the stack in a manner referred to as "flutter" and is caused by an aerodynamic instability due to a very low angle of attack of the air knife relative to the stack together with the springness of the sheet. As a result there is a dynamic bouncing of sheet two on sheet one and while it is not coincident with sheet one, sheet two will tend to shingle out of the stack with sheet one resulting in a multifeed. In addition, since the bottommost sheet and sheet two are in the same plane and with sheet two and the remainder of the stack resting on the bottommost sheet, difficulty in separating the bottommost sheet from sheet two can be encountered. This is because there may be some frictional bonding between the bottommost sheet and the next sheet. Further the operating window of air knife pressure and stack height or weight is low since for additional stack height or weight increments the air knife pressure must be increased increasing the possibility of blowing the topmost sheet off the stack. Higher air knife pressures are desired since increased amounts of air and increased air pressure increase the reliability of separation of the bottommost sheet from the rest of the stack by providing better levitation of the stack. An additional problem that may be encountered is that of lead edge curl when the lead edge of the sheet being fed may not be captured by the vacuum transport resulting in damage to the sheet and possible misfeed. Furthermore, in addition to the flutter described above, with large stacks the stack of sheets as a whole may flutter or gallop. In summary, in the bottom sheet feeders difficulties are encountered in both separating the bottommost sheet from the remainder of the stack of sheets and in levitating the remainder of the stack.

Similar problems with regard to separation exist in top sheet vacuum feeders although the necessity to levitate the stack of sheets is not present. In this configuration the air injection means is used to hold the stack of sheets down so that flutter and its attendent multifeed will not occur.

PRIOR ART

U.S. Pat. No. 3,424,453 (Halbert) illustrates a vacuum sheet separator feeder with an air knife wherein a plurality of feed belts with holes are transported about a vacuum plenum and pressurized air is delivered to the leading edge of the stack of sheets.

U.S. Pat. No. 2,594,373 (Watson) illustrates a sheet separator with two nozzles wherein each nozzle has two vertically elongated jets which impinge on deflecting surfaces at the mouth of the nozzle to deflect air centrally toward the nozzle mouth which creates a highly turbulent forward moving blast of air. The device is used to separate the rear edge of a stack of sheets as the sheet is advanced forwardly by suckers.

U.S. Pat. No. 3,294,396 (Staines) discloses two sets of air nozzles at the rear of a stack of sheets to be fed, one set to separate the sheets from the stack and the other to float the sheet.

U.S. Pat. No. 3,079,149 (Childs) illustrates the top sheet feeder in which a stream of air rifles a stack of sheets so that the top sheet can be picked up by a vacuum arm. Air rushing into a vacuum duct is used to hold the edges of a sheet down while they are being separated along a different edge.

U.S. Pat. No. 2,402,442 (Perry) describes a sheet separating device containing a baffle which directs two jets of air at the outer edges of a stack of paper. The baffle sets up "whirling" air currents under the top sheet which separates it from the lower lying sheet.

U.S. Pat. No. 3,980,293 (Shelmire) discloses a sheet separating mechanism in which the rear of the top sheet is initially lifted with a vacuum arm followed by air blasts from the rear and front which provide an air cushion between the first and second sheets. The device also incorporates holdown feet for sheets underlying the topmost sheet.

SUMMARY OF THE INVENTION

It is an object of the present invention to provide an improved sheet separator feeder.

It is an additional object of the present invention to provide a sheet feeder of improved reliability with a greater variety of paper weights and sizes.

It is an additional object of the present invention to provide an improved air knife.

It is a further object of the present invention to provide a larger operating window between air pressure and stack weight in a bottom vacuum sheet feeder with an air injection means at the lead edge of the stack of sheets.

It is a further object of the present invention to provide better separation of the sheet in the stack to be fed from the remainder of the stack.

It is an additional object of the present invention to reduce the amount of second sheet flutter and thereby the occurrance of multifeed failures.

It is a further object of the present invention to provide better levitation of the remainder of the stack after the bottom sheet has been fed in a bottom sheet feeder.

These and other objects are attained with a sheet feeding apparatus for feeding sheets from a stack of sheets in a supporting tray including means to feed a sheet from a stack of sheets and air injection means disposed adjacent the front of the tray to inject air between the sheet to be separated and the remainder of the stack, the air injection means including means to inject a substantially planar stream of air between the sheet to be separated and the remainder of the stack, the planar stream of air having portions at its sides which converge toward the center of the planar air stream thereby providing both convergence of the air stream in the planar stream and expansion of the air stream in a direction perpendicular to that of the air stream. A specific aspect of the present invention is directed to the use of such an air injection apparatus with both bottom and top feeding vacuum corrugating feeding devices. Another aspect of the present invention is directed to an array of nozzles, the end nozzles of which are inclined toward the center of the air stream so that the air will converge over the center of the sheet stacking tray. A further aspect of the invention is directed to a vertically expending air stream providing a thumbprint area of positive vertical pressure between the sheet to be separated and the remainder of the stack near the center of the stack extending up to the leading edge of the stack, the area of positive pressure being surrounded by an area of negative pressure whereby said sheet is separated from the remainder of the stack at the center.

A further specific aspect of the air knife of the present invention includes its use with a bottom sheet feeder which is positioned in an opening at the front of the base portion of a sheet stacking tray which has two sloping planar side wings, one at each side of the opening in the base portion which are angled upward from the base plane and are angled outward from front to rear of the tray and each of which intersect the base plane along a line from a point at the rear of the tray in the approximate location of the rear corners of a rectangle the size of a sheet to be fed to a point at the front of the tray which is approximately at the transition of the rear portion of the vacuum plenum to the front portion of the vacuum plenum and further includes transition wings at the front of the sheet stacking tray which adjoin the planar side wings and which comprise a trianglar portion of a plane in which one side lies in the plane of the downwardly angled plenum, a second side lies in the plane of and adjoins the planar side wings and a third side forms part of the contour of the leading edge of the sheet stacking tray. The bottom sheet feeder comprises a vacuum plenum and separating feeding belt assembly adjacent a stack of sheets being positioned such that a rear portion of the plenum and belt assembly lies opposite a portion of a stack to be fed and adjacent and parallel to the plane of the sheet to be fed and a front portion lies opposite the first portion of a stack of sheets to be fed and in a plane angled away from the plane of the sheet to be fed.

For a better understanding of the invention as well as other objects and further features thereof, reference is made to the following drawings and description.

BRIEF DESCRIPTION OF THE DRAWINGS

FIGS. 10A and 10B are plan and side view illustrations of the air converging stream (FIG. 10A) and expanding air streams (FIG. 10B).

FIG. 11 is a plan view of an alternative embodiment of the lateral converging air knife.

DESCRIPTION OF THE PREFERRED EMBODIMENT

The invention will now be described by reference to a preferred embodiment of the bottom sheet feeding apparatus.

Figure 1:
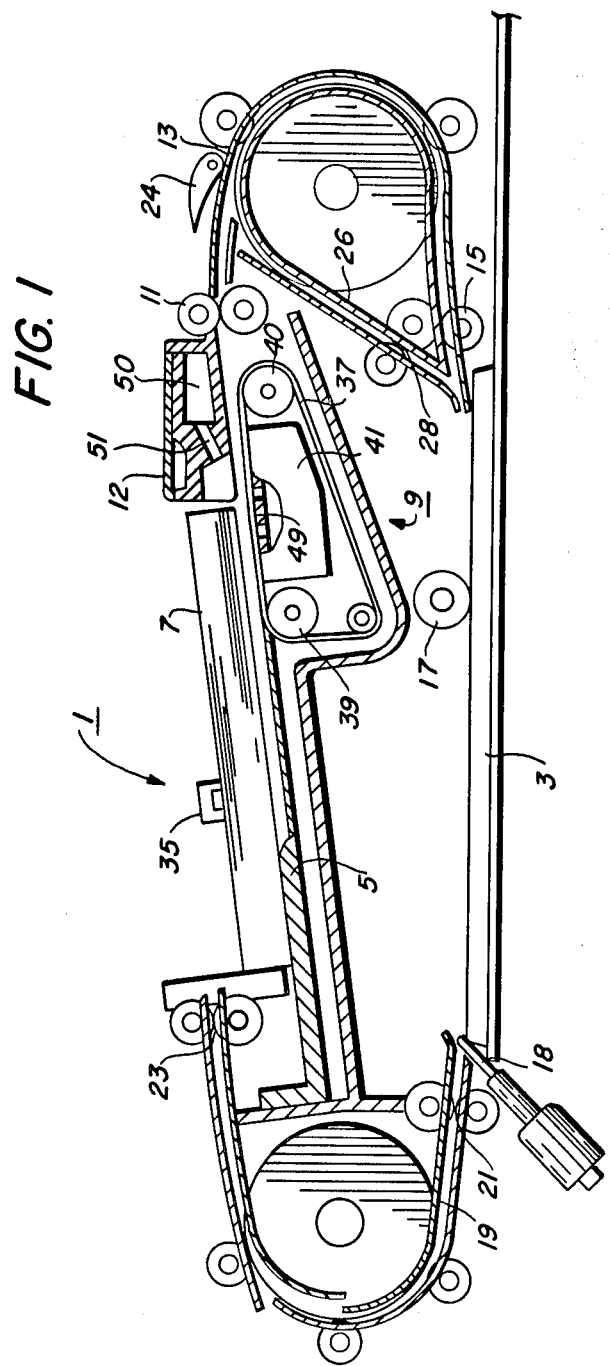
FIG. 1 is a cross sectional side view of an exemplary recirculating sheet feeder employing the present invention.

Referring particularly to FIG. 1, there is illustrated an exemplary automatic sheet separator feeder for installation over the exposure platen 3 of a conventional xerographic reproduction machine. This is merely one example of a document handler with which the exemplary sheet separator feeder may be combined. The document handler 1 is provided with a document tray 5 adapted for supporting a stacked set of documents 7. A vacuum belt corrugating feeder mechanism 9 is located below the front or forward area of the document tray for acquiring and corrugating the bottom document sheet in the stack and for feeding out that document sheet to take-away roll pair 11 through document guides 13 to a feed-roll pair 15 and under platen roll 17 onto the platen of the copy machine for reproduction. A rectractable registration edge 18 is provided here to register the lead edge of the document fed onto the platen. Following exposure of the document, the edge 18 is retracted by suitable means such as a solenoid and that document is fed off the platen by roll 17 onto guide 19 and feed-roll pair 21 and returned back to the top of the document stack 7 through a feed-roll pair 23. Gross restacking lateral realignment is provided by an edge guide 60 (see FIG. 2) resettable to a standard sheet size distance from an opposing fixed edge guide 20. The "wing" on the guide 60 helps settle incoming (restacking) sheets between the two guides 20 and 60.

In the event it is desired to present the opposite side of a document for exposure, the document is fed from the stack 7 through guides 13 until the trail edge passes document diverter 24. Document diverter 24 is then rotated counterclockwise, i.e. into the document sheet path. The document direction is reversed and the document is diverted by divertor 24 through guides 26 and feed-roll pair 28 onto the platen 3.

The document handler 1 is also provided with a sheet separator finger 35 as is well known in the art, to sense and indicate the documents to be fed versus those documents returned to the document handler, i.e. to count each set circulated. Upon removal (feed out) of the last document from beneath sheet separator finger 35, the finger 35 drops through a slot provided in the tray 5 to actuate a suitable sensor indicating that the last document in the set has been removed from the tray. The finger 35 is then automatically rotated in a clockwise direction or otherwise lifted to again come to rest on top of all the documents in the stack 7, for the start of the next circulation of document set 7.

Figure 2:
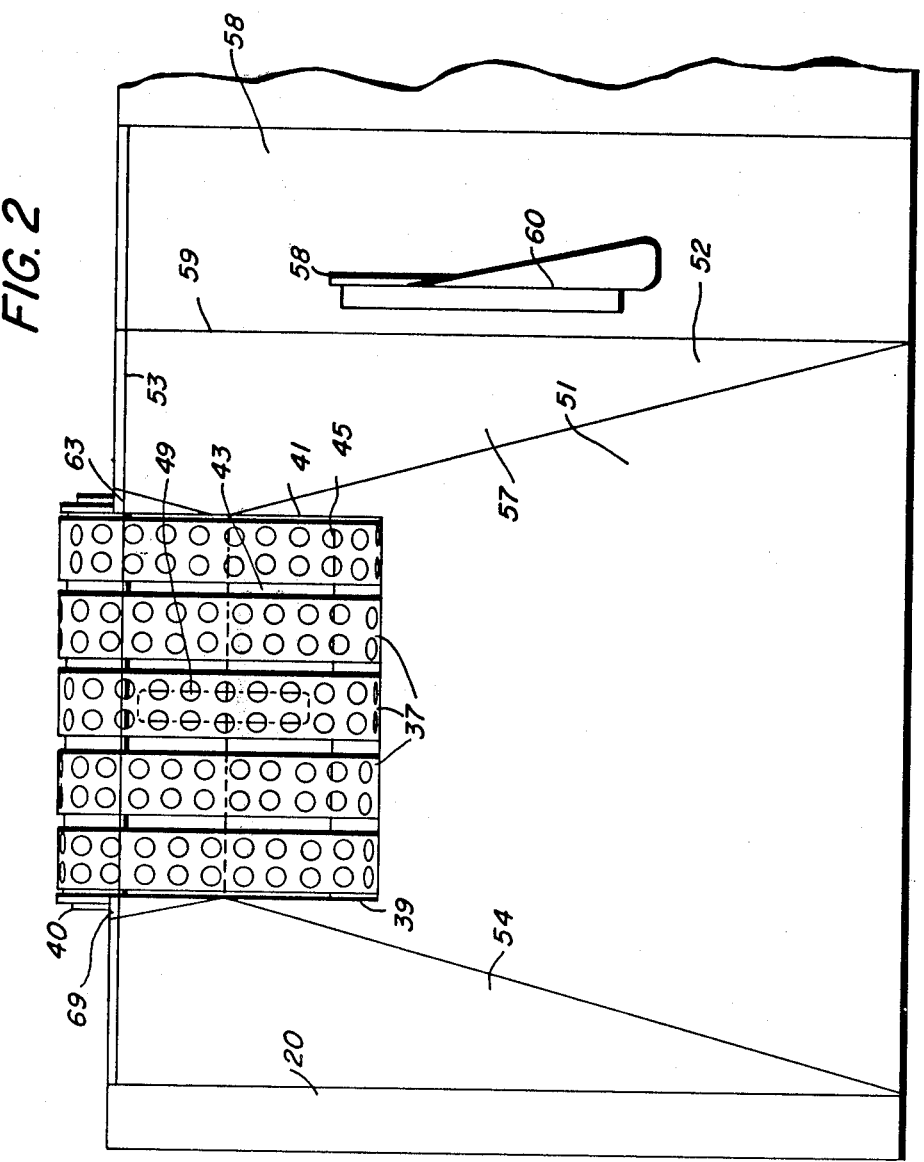
FIG. 2 is a plan view of the sheet separator feeder according to the present invention.
Figure 3:
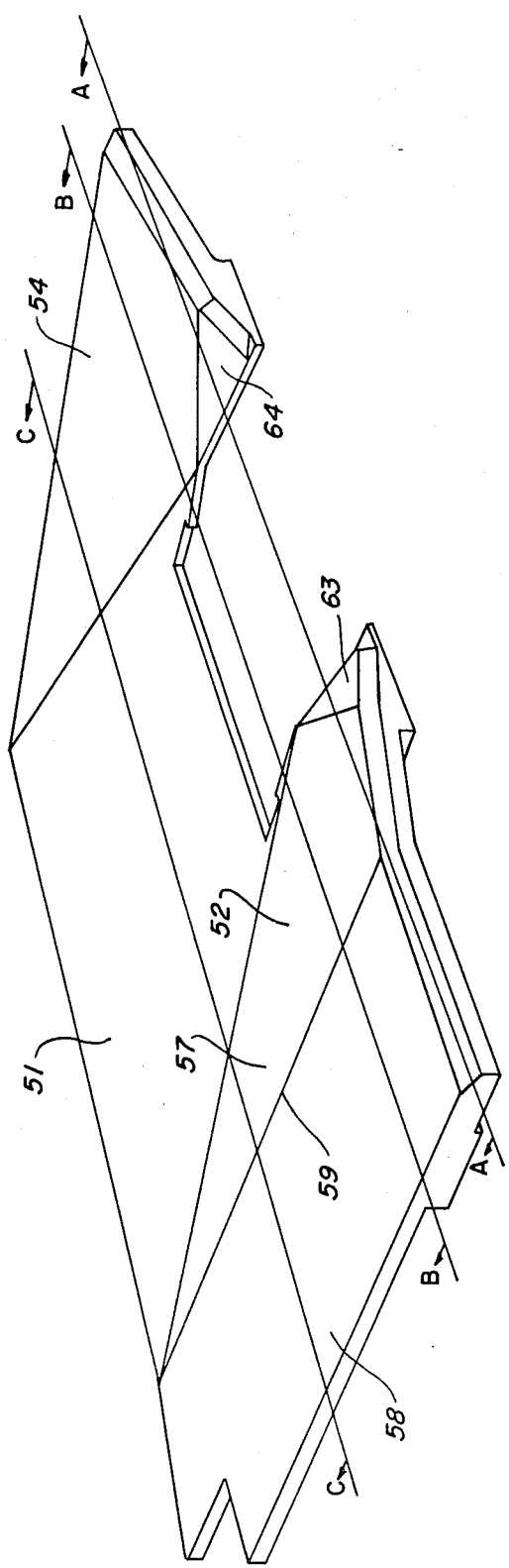
FIG. 3 is an isometric view of the sheet stacking tray useful with the present invention.
Figure 6:
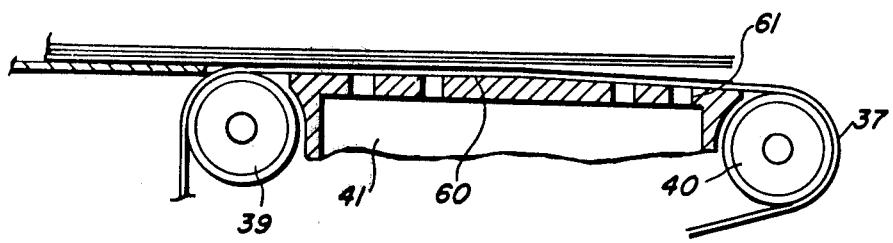
FIG. 6 is a cross sectional side view showing the bisloped plenum and sheet separator useful with the present invention.
Figure 14:
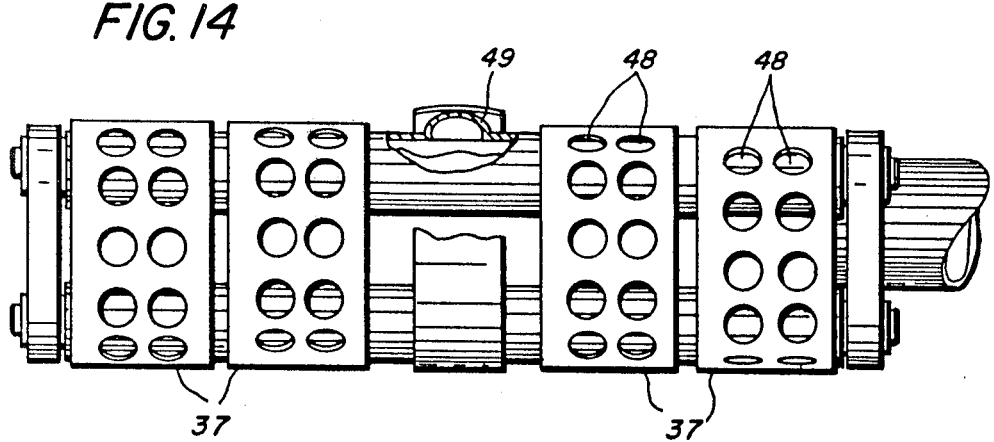
FIG. 14 is an end view partially in section of the vacuum feed belt assembly illustrated in FIGS. 1, 2 and 6.

Referring more particularly to FIGS. 2, 3 and 6 and the document sheet separator-feeder 9, there are disclosed here a plurality of feed belts 37 supported for movement on feed belt rolls 39 and 40. Spaced within the run of the belts 37 there is provided a vacuum plenum 41 having openings 43 therein adapted for cooperation with perforations 45 in the belts 37 to provide a vacuum for pulling the bottom document in the document stack onto the belts 37. The plenum 41 is provided with a raised portion 49, as illustrated in greater detail in FIG. 14, beneath the center belt 48 run so that upon capture of the bottom document in the stack against belts 37, a center corrugation will be produced in the bottom sheet. This raised portion may project above the plane of the remainder of the belts by approximately 2 millimeters. Thus the document is corrugated into a double valley configuration parallel to the direction in which it is fed. The flat surfaces of the vacuum belts 37 on each side of the raised center belt 48 generates a region of stress on the document which varies with the document beam strength. In the unlikely event that more than one document is pulled down into contact with the vacuum feed belts, the beam strength of the second (overlying) document resists this corrugating action. Thus, gaps are opened between the first and second sheets, which gaps extend to the sheet lead edges. These gaps or channels reduce the vacuum pressure levels between these sheets due to porosity in the first (bottom) sheet and provide for entry of the separating air flow from the air knife 12.

As may be observed with specific reference to FIG. 6 the vacuum plenum and belt transport assembly are provided with two portions at two different slopes. The rear portion of the assembly is in the plane of the base plane and the front portion is angled clockwise or down slightly with respect to the base plane. Since the bottommost sheet is already captured by the vacuum plenum, by pulling its leading edge down slightly, it serves to assist in separating the leading edge of the bottommost sheet from the remainder of the stack. The angling down clockwise of the vacuum plenum chamber and belt assembly provides a bidirectional corrugation to the bottom sheet by virtue of its bending along a line perpendicular to the feeding direction after having already been bent by the planar sloped wings in two directions roughly parallel to the feeding direction. This provides a good separation of the bottommost sheet from the stack since the bottommost sheet is captured and bent in a direction which the second sheet does not wish to follow. By pulling the leading edge of the bottommost sheet down it is stretched and the second sheet resists the bending and stretching and tends to break any bond that may be present between the bottommost sheet and the second sheet is thereby separated from the bottommost sheet. The front of the plenum may be bent at any suitable angle to the rear of the plenum. Ideally a greater angle should provide better separation but there is a limit to the amount that sheets can be stretched which is dependent on various characteristics of the sheet such as stiffness and condition. Typically, the front portion of the plenum is bent clockwise from the rear portion of the plenum an angle of from about 2° to about 8°. The angle is sufficient to separate the bottommost sheet from the stack but not too large to cause excessive buckling in the sheet. Particularly satisfactory results with a wide range of sheet types may be achieved with an angle of from about 3° to about $3\frac{1}{2}$°.

Figure 8:
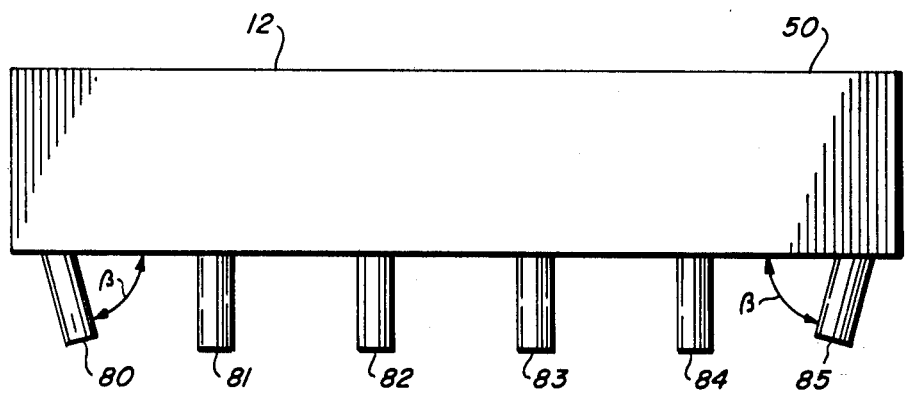
FIG. 8 is a plan view illustrating the lateral converging air knife of the present invention.
Figure 12:
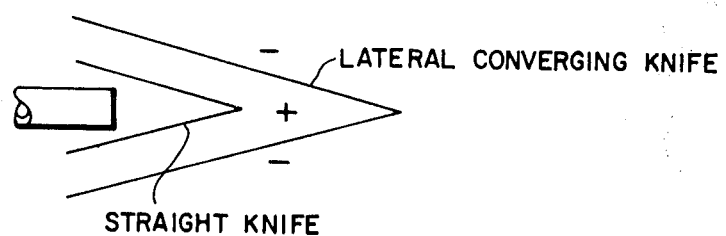
FIG. 12 is an exemplary plan view illustrating comparison of the area of maximum pressure achieved with a conventional air knife and one according to the present invention.
Figure 13:
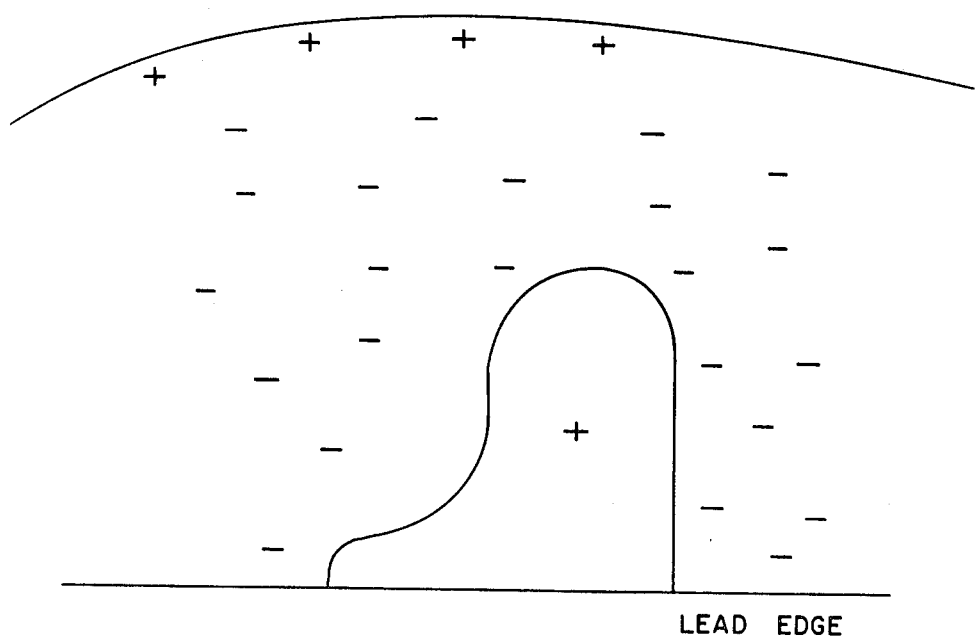
FIG. 13 is an illustration of an exemplary pressure pattern showing the positive pressure footprint which may be achieved with the lateral converging air knife.

With reference to FIGS. 8–13, the air injection apparatus or air knife 12 of the present invention will be described in greater detail. FIG. 8 illustrates a pressurized air plenum 50 having an array of separated air nozzles 80–85 inclusive. The middle four nozzles 81–84 direct the air stream straight ahead in parallel air streams while the two end nozzles are angled toward the center of the parallel air streams and provide converging streams of air. Typically the end nozzles are angled inwardly at an angle β of from about 20° to about 50° to the direction of the main air stream. Particularly effective separating of the sheet to be fed from the remainder of the stack is achieved when the outermost nozzles are at an angle of about 30°. The nozzles 80-85 are all arranged in a plane so that the air stream which emerges from the nozzles is essentially planar. As the stream produced from nozzles 80 and 85 goes out from the end of the nozzles they tend to converge laterally and drive the other air streams toward the center of the stream. This may be more graphically illustrated with reference to FIG. 10 wherein the plan view, A, shows the generally converging nature of the air stream path at the ends or sides of the air stream. With this contraction of the air stream in the plane of the original air stream there must be an expansion in the direction perpendicular to the air stream. Stated in another manner, while the air stream converges essentially horizontally it expands vertically which is graphically illustrated in the side view of the air stream of FIG. 10B. If the air knife is positioned such that the lateral convergence of the air stream and the vertical expansion of the air stream occurs at the center of the lead edge of a stack of sheets and particular in between the sheet to be separated and the rest of the stack, the vertical pressure between the sheet and the rest of the stack greatly facilitates separation of the sheet and in the case of a bottom sheet feeder levitation of the remaining stack of sheets. In this orientation a generally planar flat jet of air is directed in between the sheet to be separated and the remainder of the stack. Once the stream has been introduced to this gap it contracts in the planar direction as a result of the end or side air streams being directed inward toward a center of the air knife and therefore it must expand in the vertical direction with increased pressure both up and down. An exemplary pressure profile produced with such an air knife configuration is illustrated in FIG. 13 wherein it may be seen that a thumbprint of high pressure exists in the center of the stack along the lead edge. This results in the bottom sheet being separated in the area where there is localized high pressure while the second sheet tends to corrugate in the center and thereby stiffen to enable better separation of the sheet to be fed from the stack.

As the lateral stream from the end nozzles converge the velocity of the air stream increases and since pressure is proportional to velocity the dynamic or directional pressure is increased. As a result a larger cone of maximum velocity or maximum pressure exists within the sheets in the stack. FIG. 12 is an exemplary illustration of this wherein it may be seen that a much larger cone of maximum velocity and therefore pressure exists with the lateral converging knife than with the conventional straight knife with the velocity of all air streams being the same.

Figure 9:
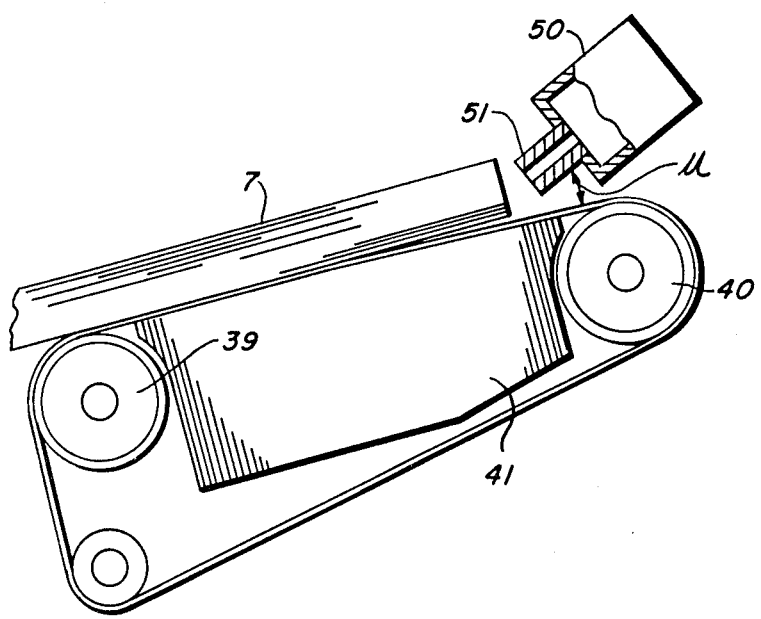
FIG. 9 is an enlarged cross sectional side view of the vacuum plenum, sheet stacking tray and air knife of the present invention.

As may be seen with reference to FIG. 9 the array of nozzles in a bottom sheet feeder is preferably placed at an angle μ to the plane of the paper being separated and fed. Typically this angle is from about 10° to about 40°. Particularly satisfactory separation is achieved with an angle of about 25° to the plane of the sheet being separated and fed.

While the lateral converging air knife has been described with reference to individual nozzles or jets other structures and configurations may be used as long as there are two planar components which oppose one another and which are essentially perpendicular to the air stream path. In this regard attention is directed to FIG. 11 where a single nozzle 90 is illustrated. The nozzle comprises a pressurized air inlet 91, an air distribution box 92 containing a deflector plate 93 which divides the single stream of air into two paths around the deflector plate. The nozzle also includes deflecting members 94 and 95 which deflect the two air streams so that they are laterally converging.

In operation the air knife injects air between the bottommost document pulled down against the feed belts and the documents in the stack thereabove to provide an air cushion or bearing between the stack and the bottom document to minimize the force needed for removing the bottom document from the stack. With the use of this air knife in conjunction with the above described bottom sheet corrugator, even if two documents are pulled down toward the belts 37, since the top sheet would not be corrugated, the air knife would inject air into the space between the two documents and force the second document off from the raised belt back toward the document stack.

According to the present invention, the lateral converging air knife creates a corrugation in the second sheet in the direction perpendicular to the feeding path and once this corrugation has been formed the lead edge is more readily captured thereby minimizing the difficulties encountered with lead edge upcurl. The corrugation in the second sheet is created as a result of the variable pressure field as shown by the footprint illustrated in FIG. 13, the high pressure in the center driving the bottom sheet down and the second sheet up. As a further result of the corrugation in the second sheet, the propensity for the second sheet to flutter and for larger stacks to flutter as a whole is dramatically decreased. Furthermore the air knife provides a much more effective and efficient separation of the bottom sheet from the top sheet in that there is a vertical velocity vector generated as a result of the lateral converging air streams which provides a dynamic pressure separation. As a result of the increased vertical pressure levitation of the stack is improved and higher pressures from the air knife can be employed since the corrugation in the second sheet stiffens the sheet and reduces the possibility of flutter and blow away. A much larger operating window of pressure is thereby provided. While the above discussion has been principally with regard to bottom vacuum corrugated feeders, similar advantages apply with regard to the separation of the sheet one from sheet two for top vacuum corrugation feeders. In this instance the air knife is used to separate the top sheet from the remainder of the stack and in particular to hold down the remainder of the stack as the top sheet is fed forward.

As can be seen by reference to FIG. 2, the stack tray is designed such that the lead edge of the sheets in the stack are spaced a slight distance from the front edge of the tray. Further, the air knife is canted as shown in FIG. 1 such that the air streams are discharged at an angle to the plane of the surface of the belts. With this disclosed interrelationship between the vacuum feed belts, the lead edge of the stack of sheets, and the air knife location and angular orientation, the document feeder is capable of reliably separating and feeding individual document sheets even if the sheets have some up-curl.

By suitable valving and controls, it is also desirable to provide a delay between the time the vacuum is applied to pull the document onto the feed belts and the start up of the feed belts, to assure that the bottom document is captured on the belts before belt movement commences and to allow time for the air knife to separate the bottom sheet from any sheets that were pulled down with it.

To further increase the efficiency of the system, the stack tray is provided with a rearward tilt as shown in FIG. 1. When flotation air is provided under the stack or between the first and second sheets, gravity will allow the sheets to settle or float back against the rear tray wall. Thus, the sheet being removed is pulled uphill while gravity helps hold the remainder of the sheets back, helping to prevent multifeeds, and providing alignment or initial end registration of the stack 7 on one axis (in the feeding direction).

With continued reference to FIG. 2 and particular reference to FIG. 3, the sheet stacking tray 5 of a preferred embodiment will be described in greater detail. The sheet stacking tray in its simplest form comprises a planar base portion 51 which defines a base plane and has an opening at its front end where the vacuum corrugated separator feeder may be inserted. The tray further includes two sloping planar side wings 52 and 54 which intersect the base plane. The planar side wings are positioned at a small acute angle $\theta$ of from about 3 degrees to about 6 degrees relative to the base plane as may be more clearly seen from the section of FIG. 3 taken along the line CC depicted in FIG. 4C. In addition, the planar side wings are angled outward from front to rear and are so located that for a nominal size sheet to be separated and fed that they intersect the base plane along a line from a point at the rear of the tray in the general location of the rear corners of a rectangle the size of the nominal sheet to be fed to a point at the edge of the vacuum transport. The intersection of the planar side wings and the base plane at the front is in the general location midway between the front corners of a nominal sheet to be fed and the centerline of the sheet. In particular, the intersection of the planar side wings and the base plane at the front which is at the edge of the plenum at the transition of the rear portion of the vacuum plenum to the front portion of the vacuum plenum. Two downwardly sloped triangular transition wings 63 and 64 are formed in the very front of the tray. The planes form a pocket with an opening at the front of the stack in which the sheet separator feeder mechanism may be inserted and through which air may be injected by the air knife to levitate the stack. In operation the vacuum plenum is energized and the bottommost sheet is sucked down onto the feed belts and captured. The air knife injects pressurized air toward the bottommost sheet of the stack which may already be slightly separated from the remainder of the stack and forces air between the bottommost sheet in the stack and the remainder of the stack.

The objective of the tray design is to form an efficient aerodynamic bearing between the bottommost sheet and the remainder of the stack to reduce friction between the bottommost sheet and the next sheet and enable much easier feeding of the separated sheet. This is accomplished with the present tray since a pocket is formed between the bottommost sheet and the remainder of the stack when the bottommost sheet is captured by the plenum chamber which geometrically develops the sheet by bending only without buckling and thereby forms a seal around the two sides and rear of the tray between the bottommost sheet of a stack and the remainder of the stack. The pocket is formed by the planar side wings lifting the edges of the bottommost sheet against the rest of the stack which together with the opening at the front of the stack to enable injection of pressurized air forms an air bearing since air is forced into the pocket and forced to escape from the sides and rear of the sheet thereby levitating the remainder of the stack and separating it from the bottommost sheet. With the present configuration, the pocket is sealed around both sides and the rear to a very great degree which is desirable since high pressure provides the best levitation. High pressure cannot be achieved unless a good seal is formed. In addition, with the present design, the ratio of the opening between the bottommost sheet and the remainder of the stack at the rear of the tray to the opening between the bottommost sheet and the remainder of the stack at the front of the tray is relatively small and therefore the pressure is relatively large at the rear of the tray. This is because there is a gradual decrease in flow cross sectional area for air to escape from the sides and rear of the sheet and the decreasing distance between the top and the bottom of the flow path maintains a higher pressure closer to the outside edge of the sheet. This is in contrast to the parabolic pocket formed in the Hamlin application referred to above wherein a linear pressure drop is obtained since the flow path has parallel sides to it. In this way the specific configuration of the tray assists in providing both acquisition of the bottom sheet by the sheet separator feeder and levitation of the remainder of the stack relative to the bottommost sheet. In the acquisition phase, the bottommost sheet is deformed initially only in a developable surface by which it is meant that it is to be constructed out of straight lines only with pure bending and no buckling. This minimizes the energy required to acquire the sheet by the vacuum plenum. Furthermore since the vacuum plenum acquires the sheet without buckling, the bottommost sheet does not contort in a manner to destroy the seal at the edges around the two sides and the rear as may occur in the above referenced Hamlin application. As a result, the planar side wings tend to be insensitive to sheet stiffness because it is relatively easy to deform by bending the sheets into geometric surfaces whereas it is comparatively difficult to buckle sheets.

While the planar base portion and the two planar side wings may intersect at a line, it is preferred that this line be rounded by a radius to form a smoother surface and thereby maintain a better seal for the paper in contact with the tray at the area of intersection. This enables the formation of a better air bearing between the tray and the bottommost sheet and also between the bottommost sheet and the remainder of the stack.

The configuration of the tray has been described with reference to the size of a nominal rectangular sheet of paper which it is desired to feed. By arranging the size of the tray so that the planar side wings are angled outward from the front to the rear of the tray and intersect the base plane at the rear of the tray in the location of the rear corners of a rectangle the size of a sheet to be fed and also intersect at the front of the tray at approximately midway between the front corners of a sheet to be fed and the centerline of a sheet to be fed, maximum reliability may be achieved. However, it is possible that with any given sheet feeding apparatus sheets of more than one size may be desired to be fed. The present apparatus provides a relatively large operational window of sheet sizes in which it will work very effectively. Thus, for the selection of the particular tray configuration the particular paper sizes desired to be fed are identified and the usage factors for the various sizes are identified and the tray configuration is then picked for the overall performance desired taking into account all sizes of sheets to be fed. In this way it has been found that the ame tray may be used to effectively feed sheets in size ranging all the way from 8×10 or B5 to 11×17 or B4.

Figure 4:
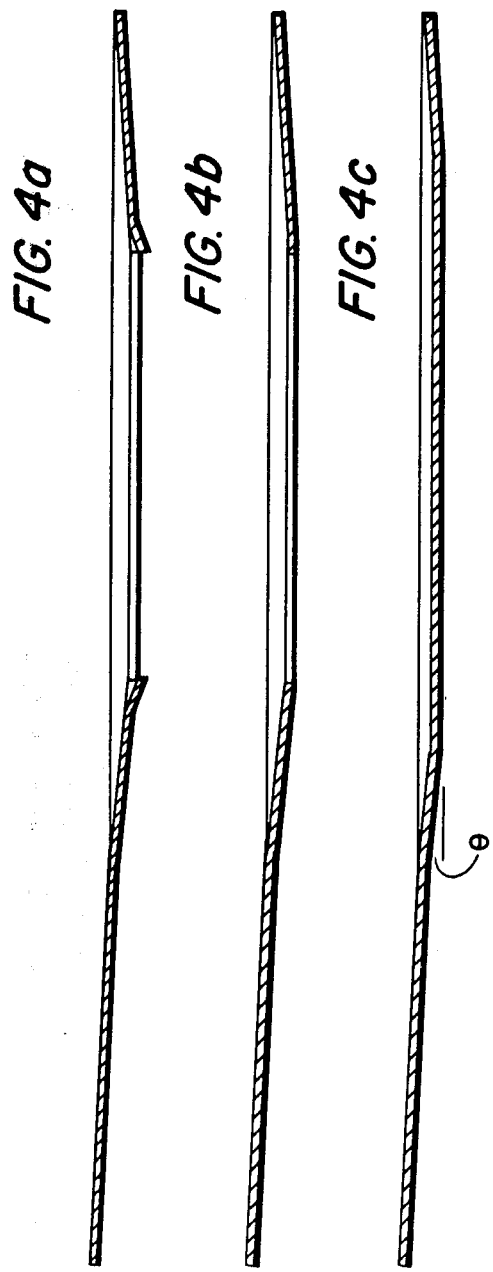
FIGS. 4A, 4B, and 4C are sectional views of the sheet stacking tray of FIG. 3 taken along the lines AA, BB, and CC.

With regard to the angle $\theta$ of the wings relative to the base plane as illustrated in the FIGS. 3 and 4, this angle should be selected based on a compromise between various sheet conditions, weights, stiffnesses and the air knife flow. Typically the angle $\theta$ may be from about 3 degrees to about 6 degrees in providing effective separation and feeding for a wide range of commonly used sheet weights and stiffness.

With particular regard to oversized sheets, attention is once again directed to FIG. 3 wherein it is noted that sloping planar side wing 52 is broken into two planes, a first planar portion 57 and a second planar portion 58 which intersect along line 59. By breaking the planar side wing in such a way, an oversized sheet of paper can be further geometrically bent at the end of its oversized dimension to enable the sheet to be fed through the same sheet feed throat or nip. In this configuration, the angle with which a first planar portion 57 meets the base plane is the angle $\theta$ and as may be seen with reference to FIG. 3, the second planar portion is bent relative to the first planar portion to a more horizontal configuration or rather, to a plane more parallel relative to the base plane. In this configuration the angle formed between the second planar portion and the plane if the second planar portion were extended in the plane to the base plane, would be smaller than the angle $\theta$ and of the order of from about 2 degrees to about 4 degrees.

With the "bisloped" plenum and belt transport configuration, the plane of the bottommost sheet as it is fed forward is altered downwardly and the sides of sheet should also be permitted to slope downwardly. Accordingly two small downwardly sloped planar transition wings 63 and 64 are formed in the front of the tray adjacent the opening and the downward sloping section of the vacuum plenum and feed belt assembly. These transition wings intersect the planar sloping side wings beginning at a point adjacent the opening in the planar base portion where the transition in the slope of the vacuum plenum and feed belt assembly occurs and extends forwardly to the end of the tray. The transition wings may be described as the triangular portion of a plane in which one side lies in the plane of the downwardly sloped or angled portion of the plenum, a second side lies in the plane of the planar sloping side wings and a third side which forms part of its contour of the leading edge of the tray. These two comparatively small wings provide a transition path for the sheet being fed from the downslope of the plenum to the front wings of the plenum. With the transition wings 63 and 64 at the front of the tray the line of intersection of the base plane with the planar side wings ends at the edge of the vacuum transport at the line of intersection of its two slopes.

Figure 7:
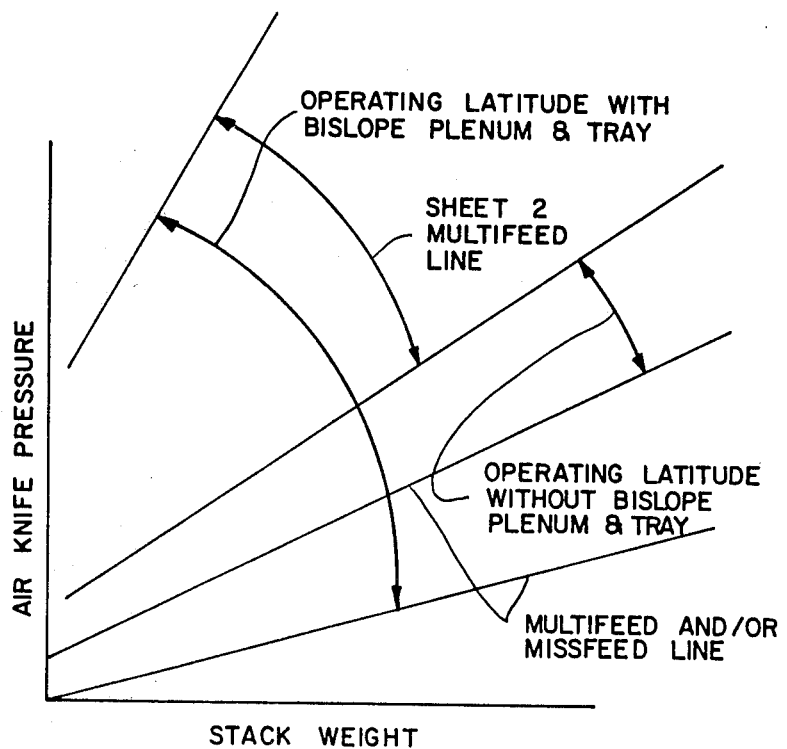
FIG. 7 is a graphical representation of the improved operating latitude achieved with the bisloped plenum and tray.

This arrangement of a bisloped vacuum plenum chamber and belt transport assembly together with the sheet stacking tray having sloping planar side wings and transition wings in a "dragon wing" configuration provides both a much better separation of the bottommost sheet from the stack and the virtual elimination of multifeed from flutter of the second sheet. With reference to FIG. 6, this may be simply viewed. The nominal position of the stack of sheets is determined by the corrugation substantially parallel to the feeding direction placed in the stack by the configuration of the tray as well as the air pressure from the air knife which tends to keep the lead edge of the stack supported. The angle formed by the front of the plenum relative to the nominal position of the stack ensures a positive angle of attack of the air stream relative to sheet two and is the characteristic which aids in eliminating sheet two flutter and thereby sheet two multifeed. The angle of the front plenum relative to the rear plenum is the angle which physically causes the bottommost sheet to be separated from the stack by being pulled down onto the transport by the vacuum. This provides a dramatically greater operating window between stack weight and air knife pressure for the system to operate. This can be illustrated by reference to FIG. 7 where the operating latitude is generally depicted. As may be observed with the bislope plenum and belt transport assembly the operating latitude of air knife pressure and sheet stack weight is dramatically increased.

In operation a stack of sheets is placed in the sheet stacking tray and the following sequence of events occurs. The air knife is activated and is on continuously. The vacuum plenum is activated which tends to pull the bottommost sheet down onto the plenum. At the same time, the bottommost sheet tends to separate slightly from the remainder of the stack of sheets, particularly at the front edge due to the downward sloping configuration of the forward end of the vacuum plenum. The air knife is activated to inject pressurized air into the pocket formed between the first sheet and the remainder of the stack and thereby levitate the remainder of the stack facilitating separation of the bottommost sheet from the stack. The feed belt assembly is activated, driving the bottommost sheet from beneath the stack in a forward direction. As the trailing edge of the bottommost sheet clears the leading edge of the stack, the vacuum plenum is turned off and for each successive sheet being fed the cycle is repeated.

As will be appreciated from the above description of the invention a much more efficient sheet separating and feeding apparatus is provided. In particular, a better seal is provided between the sheet stacking tray and the bottommost sheet to increase the efficiency of sheet acquisition and a much better seal is achieved between the bottommost sheet and the remainder of the stack of sheets to prevent less air from escaping. In addition, with a "bisloped" configuration a much more effective separation of the bottommost sheet from the stack is achieved and with the combination of "bisloped" configuration and the configuration of the sheet stacking tray a dramatic reduction in second sheet flutter with consequent reduction in multisheet feeding is achieved. This enables the efficiency of the air supply systems to the sheet separator and feeder to be increased. For example, with a more efficient system a much smaller air blower for the air knife can be used which is much quieter and which also can levitate for the same amount of air a higher stack of sheets. In addition, since the geometric design of the tray does not distinguish between different weights of paper, a greater range of paper weights and sizes may be used. With regard to different sizes of paper, it should be noted that the pocket that is formed tends to take the size of the stack of paper rather than in the prior art, taking the size and the shape of the parabolic arc. Furthermore, the system has greater reliability since it is not dependent upon the stiffness of paper and its resistance to buckling but rather is geometrically deformed without buckling. A principal advantage in the efficiency of the present invention is that the geometric shape of the tray permits a close contact between the bottommost sheet in the tray over its whole area thereby permitting an air bearing to be established at this interface due to permeation of air from the pocket through the porous sheets. This bearing makes it much easier to drive the sheet out which reduces the vacuum pressure and power required and the noise generated.

Figure 5:
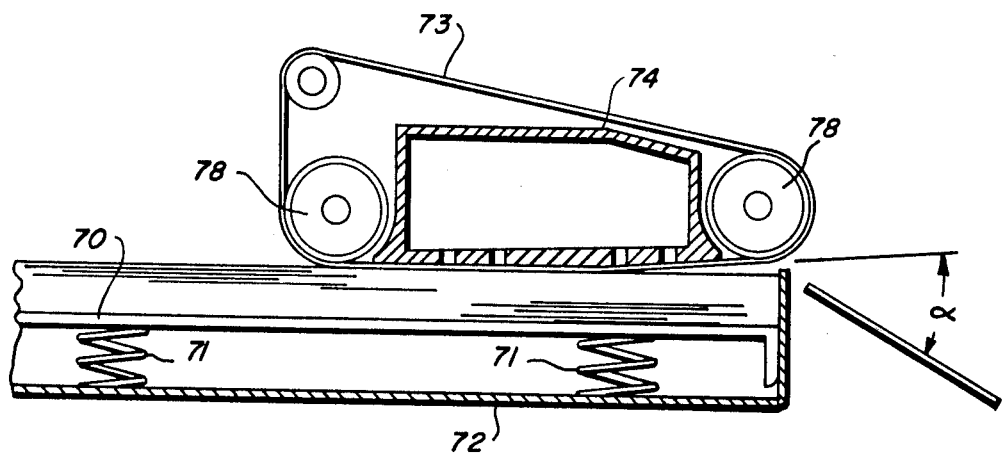
FIG. 5 is a side view of an alternative embodiment illustrating the invention as a top sheet feeder.

While the lateral converging air knife has been described with particular reference to a preferred embodiment utilizing this concept in a bottom sheet feeder it should be understood that the increased separation efficiency resulting from such concept may also be achieved with a top sheet feeder. FIG. 5 illustrates an embodiment in which the "bislope" vacuum plenum and belt assembly may be used in a top feeding configuration. A stack of sheets to be fed is placed in a tray 70 which may be supported and elevated by springs 71 from stationary base platform 72. The vacuum feed belt 73 is fixedly mounted and has vacuum plenum 74 between the run of a plurality of belts 77 which are driven about rolls 78 by means not shown. A lateral converging air knife 79 injects a stream of air between the top of the stack and the sheet which is captured by the vacuum plenum. In operation, the vacuum plenum is activated which tends to draw or suck the topmost sheet up onto belts with a slight corrugation where the two planes of the vacuum plenum and belt assembly intersect. The air knife tends to fluff the lead edge of the stack thereby separating the topmost sheet to enable it to be more readily captured by the vacuum. Once captured, the pressurized air from the air knife tends to separate the trailing edge of the sheet from the stack. After the top sheet has been captured the belt transport can be achieved to drive the top sheet in a forward direction. As may be seen with reference to FIG. 5, the array of nozzles in a top sheet feeder is preferably placed at an angle α to the plane of the paper being separated and fed. Typically this angle is from about 40° to about 80°. Particularly satisfactory separation is achieved with an angle of about 60° to the plane of the sheet being separated and fed.

It will be appreciated that the described device may be modified and varied by the skilled artisan upon a reading of the present disclosure. For example, while the present invention has been described with reference to a document handler in an automatic copying machine it has application in principle to any sheet feeding device. Similarly, while the present invention has been described with reference to a bottom sheet feeding device which comprises a vacuum corrugated feeder, it is contemplated that the lateral converging air knife of the present invention could be used with a roll or belt retard feeding device. This modification together with other modifications as may readily occur to the artisan are intended to be within the scope of the present invention.

I claim:

1. A sheet feeding apparatus for feeding sheets from a stack of sheets comprising a sheet stack supporting tray, means to feed a sheet from a stack of sheets, and air injection means disposed adjacent an edge of said tray to inject air between the sheet in the stack to be separated and the remainder of the stack, said air injection means including means to inject a substantially planar stream of air between the sheet to be separated and the remainder of the stack, said planar stream of air having portions at its sides which converge toward the center of the planar air stream thereby providing both convergence in the planar stream and expansion in a direction perpendicular to that of the air stream to facilitate separation of the sheet to be separated from the remainder of the stack.

2. The sheet feeding apparatus of claim 1 wherein said air injection means comprises a single wide nozzle across a substantial portion an edge of the sheet stacking tray, said nozzle having angular deflecting members at each end positioned to deflect the ends of the air stream in a direction to converge over the center of the sheet stacking tray.

3. The sheet feeding apparatus of claim 2 wherein said air stream is substantially horizontal and provides a greatly increased vertical pressure between the sheet to be fed and the remainder of the stack.

4. The sheet feeding apparatus of claim 2 wherein said angular deflecting members are inclined inwardly about 60° from the principal direction of the air stream.

5. The sheet feeding apparatus of claim 1 wherein said apparatus feeds the topmost sheet from a stack of sheets and wherein said air injection means at the front of the sheet stacking tray is upwardly inclined toward the lead edge of a stack of sheets and is at an angle of from about 40° to about 80° relative to the plane of the stack of sheets to be separated and fed.

6. The sheet feeding apparatus of claim 1 wherein said apparatus feeds the bottommost sheet from a stack of sheets and wherein said air injection means at the front of the sheet is downwardly inclined toward the lead edge of a stack of sheets and is at an angle of from about 10° to about 40° relative to the plane of the stack of sheets to be separated and fed.

7. The sheet feeding apparatus of claim 6 wherein said air injection means comprises an array of individual nozzles which direct air in a planar stream the end nozzles of said array being inclined in a direction to converge in the center of the air stream and over the center of the sheet stacking tray.

8. The sheet feeding apparatus of claim 7 wherein said end nozzles are each inclined from about 20° to about 50° degrees to the direction of the main air stream.

9. The sheet feeding apparatus of claim 8 wherein said end nozzles are each inclined from about 30° to the direction of the main air stream.

10. The sheet feeding apparatus of claim 1 wherein said horizontally converging and vertically expanding air stream provides a thumbprint area of positive vertical pressure between the sheet to be separated and the remainder of the stack near the center of the stack extending up to the leading edge of the stack, said area of positive pressure being surrounded by an area of negative pressure whereby said sheet is separated from the remainder of the stack at the center.

11. The bottom sheet feeding apparatus of claim 7 for separating the bottommost sheet in a stack and feeding it in a forward direction comprising a bottom sheet separator feeder, a sheet stacking tray having a planar base portion defining a base plane, the front of said base portion having an opening within which said bottom sheet separator feeder may be positioned to feed the bottommost sheet of a stack of sheets when sheets are in said sheet stacking tray, said bottom sheet separator feeder comprising at least one vacuum feed belt having a vacuum plenum disposed within the belts run, the vacuum plenum and the belts being positioned such that a rear portion lies in the plane of the base plane while a front portion lies in a plane angled clockwise to the rear portion.

12. The bottom sheet feeding apparatus of claim 11 wherein said sheet stacking tray further comprises two sloping planar side wings, one at each side of said opening in said base portion, said sloping planar side wings being angled upward from the base plane and being angled outward from front to rear of said tray, and intersecting said base plane along a line from a point at the rear of the tray in the approximate location of the rear corners of a rectangle the size of a sheet to be fed, to a point at the front of the tray substantially at the transition of said rear portion of vacuum plenum to the front portion of said vacuum plenum at the edge of the plenum and further including planar transition wings at the front of the sheet stacking tray adjoining said planar side wings, said transition wings comprising a trianglar portion of a plane in which one side lies in the plane of the downwardly angled plenum, a second side lies in the plane of and adjoins the planar side wings and a third side which forms part of the contour of the leading edge of said sheet stacking tray.

13. The bottom sheet feeding apparatus of claim 12 wherein said separator feeder comprises a vacuum friction feed means positioned in about the same plane as the base plane.

14. The bottom sheet feeding apparatus of claim 12 wherein said base plane and said sloping planar sidewings are oriented such that they provide a surface which geometrically develops a sheet by bending without buckling and thereby forms a seal around the two sides and rear of the tray between the bottommost sheet of a stack and the rest of a stack of sheets when sheets are in the tray.

15. The bottom sheet feeding apparatus of claim 12 wherein the intersections among said planar base portion and said planar sloping side wings are rounded by a radius.

16. The bottom sheet feeding apparatus of claim 12 wherein said vacuum friction feed means in said tray opening comprises a plurality of vacuum feed belts having a vacuum plenum disposed within the run of the belts, said belts being positioned such that they lie in the plane of the base plane.

17. The bottom sheet feeding apparatus of claim 16 wherein a raised portion is positioned in the center of the front portion of the vacuum plenum to provide a center corrugation member parallel to the sheet feeding direction and wherein said feed belts have perforations therein which overrun and are in communication with vacuum ports in the vacuum plenum.

18. The bottom sheet feeding apparatus of claim 12 wherein at least one of said two sloping planar side wings has two planar portions, the first planar portion being connected to and intersecting the base plane at a given angle and the second planar portion being connected to and intersecting the first planar portion the angle formed between the base plane and the second plane portion being smaller than said given angle.

19. The bottom sheet feeding apparatus of claim 12 wherein said tray is vertically inclined upward from rear to front.

20. The bottom sheet feeding apparatus of claim 12 wherein said planar side wings are positioned at an angle of from about 3 degrees to about 6 degrees relative to the base plane.

* * * * *